United States Patent [19]

Ruge et al.

[11] Patent Number: 4,457,564
[45] Date of Patent: Jul. 3, 1984

[54] TENSIONING DEVICE FOR ENDLESS CHAIN

[75] Inventors: Hans Ruge, Wardenburg; Gerald Wöbken, Elsfleth, both of Fed. Rep. of Germany

[73] Assignee: Maschinenfabrik Klaus-Gerd Hoes GmbH & Co., KG, Wardenburg, Fed. Rep. of Germany

[21] Appl. No.: 343,543

[22] Filed: Jan. 28, 1982

[30] Foreign Application Priority Data

Feb. 7, 1981 [DE] Fed. Rep. of Germany ....... 3104323

[51] Int. Cl.³ ............................................. B62D 55/00
[52] U.S. Cl. ........................................ 305/10; 305/31; 305/32; 92/52; 91/167 R
[58] Field of Search ....................... 305/10, 25, 28, 31, 305/32; 92/51–53; 91/167 R, 173; 301/10, 31, 32

[56] References Cited

U.S. PATENT DOCUMENTS

| | | | |
|---|---|---|---|
| 3,101,977 | 8/1963 | Hyler et al. | 305/10 |
| 3,692,368 | 9/1972 | Alexander | 305/10 |
| 3,912,335 | 10/1975 | Fisher | 305/31 X |

FOREIGN PATENT DOCUMENTS

| | | | |
|---|---|---|---|
| 1158379 | 11/1963 | Fed. Rep. of Germany | 305/31 |
| 1810354 | 9/1970 | Fed. Rep. of Germany | 305/10 |
| 2030019 | 12/1971 | Fed. Rep. of Germany | 305/10 |
| 2420367 | 11/1974 | Fed. Rep. of Germany | 305/10 |
| 491513 | 2/1976 | U.S.S.R. | 305/10 |

Primary Examiner—David A. Scherbel
Attorney, Agent, or Firm—Collard, Roe & Galgano

[57] ABSTRACT

A tensioning device, especially for endless chains of a tracklaying vehicle, is provided which is formed as a working cylinder which is connected to a pressure-regulated hydraulic source and whose cylinder chamber, which guides a tensioning piston pressing against the guide wheel, is provided with an outlet comprising a pressure relief valve and an inlet, connected to the hydraulic source, with an incorporated nonreturn valve.

2 Claims, 1 Drawing Figure

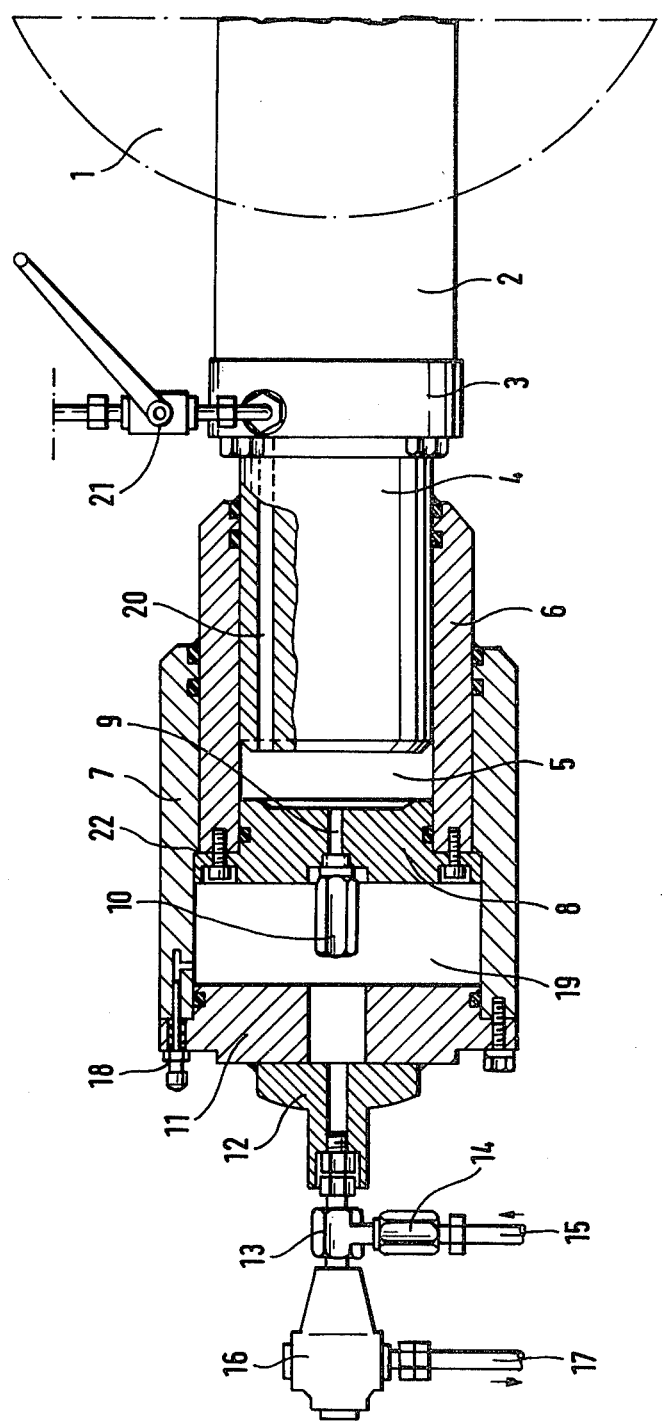

TENSIONING DEVICE FOR ENDLESS CHAIN

The present invention relates to a tensioning device, especially for the endless chain of a tracklaying vehicle. More particularly, it relates to a tensioning device acting on a guide element of a rotating chain or the like, preferably on the guide wheel for the endless chain of a tracklaying vehicle.

Endless chains should always be sufficiently taut so as not to run off. However, they should run over a guide wheel and over a drive wheel as freely and loosely as possible, so that an automatic cleaning can take place. If this automatic cleaning does not take place in the case of chains which are constantly tensioned, dirt accumulates, especially in the tooth spaces of the drive wheel, as a result of which the chain is forced to run into the teeth.

Furthermore, one of the wheels, usually the guide wheel, must be able to yield in order to prevent breaks occurring if, for example, a stone gets between the drive wheel and the chain. However, it should on no account yield when, for example, the tractive force of the upper chain strand or run has to be taken up by the guide wheel during steering or reverse travel. On the other hand, the spring forces should not be so great, even in the case of complete spring excursion (i.e. elongation), that axles or wheel mountings are damaged. Further, no great impacts should occur during backspring.

The requirements of a tensioning device are therefore as follows: firstly, it should be automatically adjustable as far as possible; secondly, the constantly active tensional force should be as small as possible; thirdly, the holding force should be sufficiently great to take up the normal chain pull; fourthly, the spring action should not, as far as possible, be greater than the holding force, even during complete spring excursion; fifthly, the backspring should not occur abruptly; and sixthly, the forces should be adjustable, according to the type and size of the machines.

Known chain tensioners operate with metal, gas or plastic springs, which can be adjusted as required by grease or oil cocking cylinders. The springs are internally pretensioned to 23 metric tons, for example, such that the initial tension does not constantly act on the chain, but only becomes effective when the spring action begins. A spring excursion of, for example, 50 mm results in a tractive force in the chain of, for example, approximately 50 metric tons, which has a negative effect on the gearing and drive wheel mountings of the tracklaying vehicle and may damage the latter. These high spring tensions also cause the chain to practically "crash" into the drive wheel again after jumping over a tooth.

The initial tension in conventional chain tensioners with springs may be too low owing to spring fatigue, so that the chain begins to jump even when there is a slight increase in tension, as occurs, for example, when the tracklaying vehicle is steered.

Improvements to these embodiments are also known in which the metal or pneumatic springs act on hydraulic media and, instead of the direct, pretensioned tension springs, act indirectly via these media by being actuated by a fluid which is displaced by the insertion of a spring plunger. With respect to single springs, this solution has the advantage that, owing to the fact that a pressure relief valve, which is adjusted to the holding force, is mounted in the overflow duct, an additional resistance is produced which increases during the spring action only by the spring force which, in this case, is correspondingly relatively slight. Consequently, in this solution, the increase in spring force during spring action is not so great, and the recoil action is not so violent. However, this solution has not proved successful with respect to the obtained improvement on account of the complicated design and the various tensioning devices which have to be used, depending on the size of the machines.

It is therefore an object of the invention to provide a device by means of which the endless chain is held as to cope with all operating conditions, in which the tensional force is therefore as low as possible, tension regulation is automatic, the holding force is sufficiently great and adjustable, the force until the end of the path of spring action is not greater than the holding force, and the restoring force is sufficient, but not too violent.

This object is attained according to the invention in a device of the above-mentioned type in that it is formed as a working cylinder which is connected to a pressure-regulated hydraulic source and whose cylinder chamber, which guides a tensioning piston pressing against the guide wheel, is provided with an outlet comprising a pressure relief valve and an inlet, connected to the hydraulic source, with an incorporated nonreturn valve.

With respect to the hitherto known tensioning devices with springs, the tensioning device according to the invention has the advantage that the piston power, which is dependent on the controllable or adjustable pressure of the hydraulic source, produces the required tensional force and that the holding force, which is adjusted upon the spring action of the guide wheel, can be predetermined by the pressure relief valve and does not increase until the end of the path of spring action. If the hydraulic source forces the working medium, e.g., hydraulic oil, into the cylinder chamber at a constant pressure of, for example, 50 bar, this results in the tensional force and, at the same time, the restoring force. The piston supporting the guide wheel could only enter the cylinder chamber when these forces are exceeded, but is prevented from doing so by the nonreturn valve, so that the pressure which is building up in the cylinder chamber rises above the 50 bar supplied by the hydraulic source until the adjusted pressure relief valve opens.

This pressure is usually higher than that required to produce the tensional force. With respect to springs with progressive, steeply rising characteristic curves, the tensioning device, according to the invention, has the advantage that a constant characteristic curve is obtained during spring action whose height is a function of the adjustment of the pressure relief valve and that an essentially lower characteristic curve, also constant, is obtained during the recoil action whose height is a function of the adjusted pressure of the hydraulic source.

Modern tracklaying vehicles for different operations, for example, draining ploughs, excavators, road finishers, etc., are provided with hydraulic motors as drive elements, so that a hydraulic source is already provided in vehicles of this type. For example, pumps which produce a constant pressure of approximately 50 bar, are used for the steering clutches of drive shafts, so that there is no need to install an additional pump in modern tracklaying vehicles. In other vehicles, it is usually also possible to use pumps which are already provided, for example, of control circuits of conveying hydraulic technology. It is, however, also possible to install separate geared pumps with a pressure-retaining valve or a pressure-controlled piston pump.

The tensioning piston, which can be extended as a function of the pressure of the hydraulic source and which pretensions the chain with a predetermined tensional force, also replaces a tension regulation of the chain, which was previously necessary in conventional spring chain tensioners, by a so-called "grease tensioner". The pretension, which is adjusted as a function of the pressure of the hydraulic source, is sufficiently small not to overtension the chain. The nonreturn valve enables the tensioning piston to be held in its extended position.

In a preferred embodiment of the tensioning device, the tensioning piston is guided in a holding cylinder which is formed as a holding piston guided in the working cylinder. In this embodiment, the piston crown of the holding piston is provided with a through-opening in which a second nonreturn valve is mounted.

This preferred embodiment has the further advantage that, when the piston system is compressed, the restoring force resulting from the constant pressure of the hydraulic source acts upon the holding piston, which has a greater piston area than the tensioning piston acting on the guide wheel. The restoring force is, therefore, greater and suffices to re-tension the chain in a sufficiently quick manner. This restoring force is, however, smaller with respect to conventional spring tensioners, so that a violent impact, resulting in damage, is avoided when the chain jumps over.

The tensioning device according to the invention can be inexpensively produced and needs no maintenance, as the tension of the chain is automatically regulated.

In order to remove the chains for repair work or the like, a spherical faucet can be provided by means of which the pressure of the working medium maintained by the nonreturn valves in the cylinder chambers can be released.

It is, of course, also possible, without departing from the scope of the invention, to use the tensioning device in, for example, chain cutters of trench cutting machines, conveyor belts, or the like.

Other objects and features of the present invention will become apparent from the following detailed description considered in connection with the accompanying drawing, which discloses one embodiment of the invention. It is to be understood that the drawing is to be used for the purposes of illustration only, and not as a definition of the limits of the invention.

The drawing shows a schematic sectional view through a chain tensioner according to the invention.

Referring now in detail to the drawing, a guide wheel 1 is shown in phantom line which is used at the end of a tracklaying vehicle to turn round an endless chain (not shown). The guide wheel is supported via a schematically-indicated guide wheel support 2 on the piston head 3 of a tensioning piston 4 which, in turn, is guided in a holding cylinder 5.

Holding cylinder 5 is externally formed as a holding piston 6, which is displaceable in a working cylinder 7. The piston crown 8 of the holding piston 6 is provided with a through-opening 9 to the holding cylinder 5, in which opening a second nonreturn valve 10 is mounted. The cylinder head 11 of the working cylinder is provided with an opening 12 which serves as an inlet and an outlet. Connected to opening 12 is a pipeline which is connected to a T-fitting 13 and which, with the interposition of a non-return valve 14, continues via the pipeline 15 to a pressure-controlled hydraulic pump which delivers a working medium, for example, hydraulic oil, at an adjustable, constant pressure. The T-fitting 13 is also connected to an adjustable pressure relief valve 16, from which a return pipe 17 extends to the supply container (not shown) which contains the working medium and which also supplies the pump.

A vent 18 is provided for the cylinder chamber 19 of the working cylinder 7. Further, the tensioning piston 4 is provided with an axial bore 20, the exit of which is at the piston head 3 and which leads to a spherical faucet 21 by means of which the pressure of the working medium maintained by the nonreturn valves in the cylinder chambers can be released.

The device operates as follows.

A pressure-regulated pump, which is not shown, delivers hydraulic oil through the opening 12 to the cylinder chamber 19 of the working cylinder via the pipeline 15 and the nonreturn valve 14, the holding piston 6 extending as far as a stop 22 formed by a recessed step. The pressure medium, which is conveyed further, then flows through the second nonreturn valve 10 and the opening 9 into the holding cylinder 5, as a result of which the tensioning piston 4 is extened and presses with the piston head 3 against the guide wheel support 2 bearing the guide wheel 1 until the endless chain, which is not shown and which runs over the guide wheel 1, is tensioned.

The necessary tensional pressure is dependent on the piston area of the tensioning piston 4 and the regulated pressure of the working medium which is supplied via the pipeline 15 and the nonreturn valve 14.

As the pressure is maintained constant, it is not necessary to regulate the tension of the endless chain. The latter is constantly held at a preselected tension.

As soon as the tension of the endless chain increases, as a result, for example, of a stone in the drive wheel, the guide wheel 1 must be able to undergo a spring action. The second nonreturn valve 10 is initially closed as a result of the tensioning piston 4 springing into the holding cylinder 5. The force exerted by the guide wheel does not therefore press the tensioning piston 4, but rather the holding cylinder 5 back into the working cylinder 7, in whose cylinder chamber 19 a pressure builds up and closes the nonreturn valve 14.

If the pressure building up in the cylinder chamber 19, resulting from the force exerted by the increasing tension in the endless chain on the guide wheel, reaches a level which exceeds the value set in the adjustable pressure relief valve 16, oil is forced out of the cylinder chamber 19 via the pressure relief valve 16 and the return pipe 17 connected thereto, so that the holding piston 6, and therefore, also the guide wheel 1, is pushed in.

If the increased tension in the endless chain is again reduced, as a result, for example, of the stone falling out or the endless chain jumping over a tooth in the drive wheel of the vehicle, which is not shown, the pressure in the cylinder chamber 19 decreases, the pressure relief valve closes, the nonreturn valve 14 opens again and working medium is forced into the cylindrical chamber 19 by the pump, as a result of which the holding piston is again extended and pressed against the guide wheel until the original operating condition is re-established.

The tensioning device according to the invention can also be used in the case of other rotating chains, for example, chain cutters or trench cutting machines, as well as conveyor belts, etc.

In summary, endless chains should rotate with the lowest possible operating tension. Owing to an external effect on the endless chains, e.g., stones coming between the endless chain and the drive wheel, the tension in the chains may increase until it reaches intolerable values, which is why tensioning devices must be able to yield resiliently. The force which is, in this case, exerted on the chain by a tensioning device and which opposes the force resulting from the increased chain tension, should, as far as possible, not be greater than the force resulting from the normal operating tension of the chain. This cannot be obtained with hitherto conventional tensioning devices operating with springs, but is achieved with a tensioning device according to the invention.

Thus, while only one embodiment of the present invention has been shown and described, it is obvious that many changes and modifications may be made thereunto without departing from the spirit and scope of the invention.

What is claimed is:

1. A tensioning device for an endless chain having a guide element, comprising:

a working cylinder having a cylinder chamber;

a holding cylinder formed as a holding piston guided in said working cylinder;

a tensioning piston displaceably guided in said holding cylinder for pressing against said guide element;

inlet means for connecting said chamber of said working cylinder to a pressure regulated hydraulic source, said inlet means including a nonreturn valve;

outlet means in said working cylinder including a pressure relief valve; and means hydraulically communicating between said cylinder chamber of said working cylinder and said holding cylinder.

2. The tensioning device as defined in claim 1 which includes a second nonreturn valve disposed in said means hydraulically communicating between said holding cylinder and said cylinder chamber of said working cylinder so that the pressure medium in said holding cylinder does not return to said cylinder chamber of said working cylinder.

* * * * *